United States Patent Office 2,802,587
Patented Aug. 13, 1957

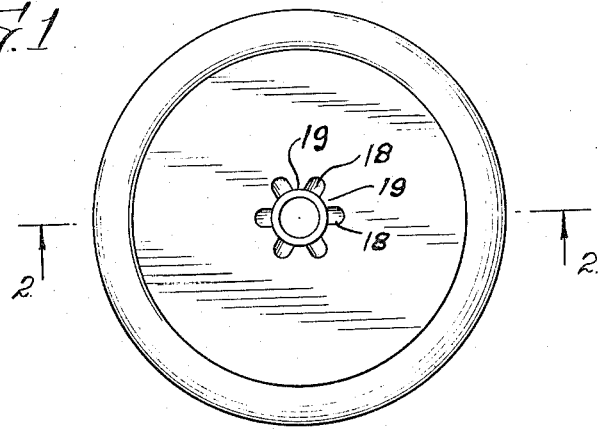
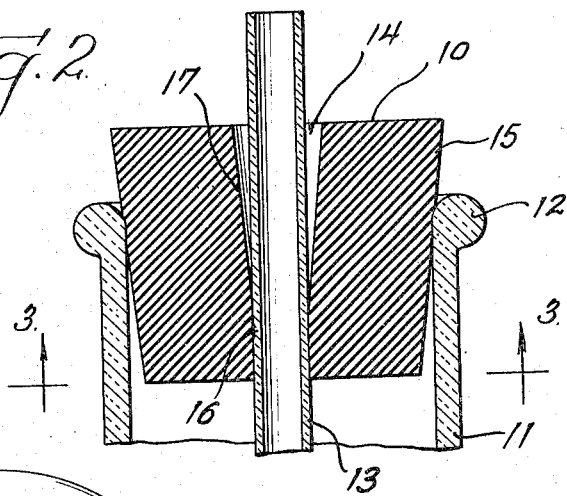
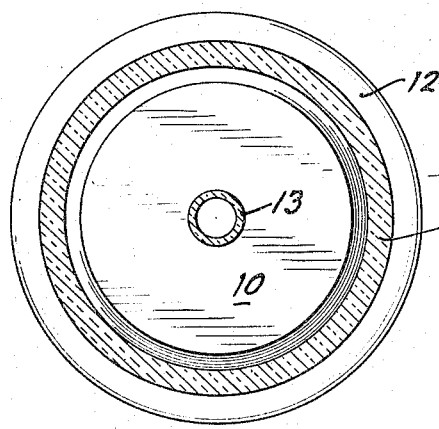

2,802,587

STOPPER

Jean W. Parvin, Chillicothe, Ill.

Application July 26, 1954, Serial No. 445,784

1 Claim. (Cl. 215—73)

This invention relates to a stopper, and more particularly to a resilient stopper having one or more passages extending therethrough for removably receiving a tube therein. The invention is useful as a stopper or closure for flasks and bottles, for example, such as those which are used in laboratories.

Rubber stoppers useful in closing the open mouths of flasks and bottles are well known, and conventionally such stoppers are provided with one or more passages therethrough; glass tubes are inserted into the passages and extend downwardly and into a liquid stored within the bottle or flask. The glass tubes in several bottles may be interconnected so that fluids, both liquids and gases, may be transferred from one bottle or flask to another or otherwise utilized in the flow of liquids into or from the flask. Inserting and withdrawing the glass tubes from the rubber stoppers has heretofore presented a problem in that a fluid-tight seal must be provided between the glass tube and the walls of the stopper which define the passage. In order to provide such a seal the tube must fit tightly. Therefore, breakage of the fragile tubes in positioning and withdrawing them from their position within the stoppers occurs frequently, and further often the glass tubes are frozen or become locked within the passages and removal therefrom without breakage is virtually impossible. There has long been a need for an improved stopper in which the glass tubes could be easily inserted into and withdrawn from the passages provided by the stoppers.

It is accordingly an object of this invention to provide a stopper for closing the mouth on bottles and flasks and the like, and which are provided with at least one passage extending therethrough that permits relatively easy insertion of a tube into a passage and withdrawal therefrom, while at the same time providing a fluid-tight seal about the tube when it is in position. Another object of the invention is to provide a resilient stopper for bottles and flasks, etc. that has a passage extending therethrough adapted to removably receive glass pieces such as funnel tubes, thistle tubes and other tubes; the passage being so constructed that a fluid-tight seal is provided about the tubes when within the passage (the tubes being held in a true vertical position when therein), and the tubes are readily withdrawn from or inserted into the passage with only a minimum of frictional resistance to the movement thereof.

A further object is in providing a rubber tube of substantially conventional character for closing bottles and flasks and the like, and which is provided with at least one passage extending axially therethrough. The passage is provided with tapered channels spaced apart thereabout which diverge upwardly and outwardly, the passage having also axially extending ribs interposed between the channels and which are adapted to grip a tube inserted into the passage, the channels converging at a spaced point above the bottom of the stopper, whereby a continuous passage wall of uniform cross section is provided therebelow to grip and form a seal about a tube within the passage. Additional objects and advantages will appear as the specification proceeds.

An embodiment of the invention is illustrated in the accompanying drawings, in which—

Figure 1 is a top plan view of a bottle or flask having a stopper embodying the invention mounted within the mouth thereof; Figure 2 is a vertical sectional view taken on the line 2—2 of Figure 1; and Figure 3 is a transverse sectional view taken on the line 3—3 of Figure 2.

Referring first to Figure 2 in particular, it is seen that a stopper 10 is shown positioned in the mouth of a flask or bottle 11. The bottle 11 may be formed of any conventional material, but ordinarily will be formed of glass as is indicated. The bottle may be provided with an enlarged bead 12 about the open top or mouth thereof. The stopper 10 is preferably rubber but may be formed of any other suitable material that provides sufficient resiliency to form a seal about the mouth of the bottle and about the tube 13 which is positioned within a passage 14 extending vertically through the stopper. The stopper may be substantially conventional and is provided with a tapered peripheral wall 15 that permits it to be easily inserted into the mouth of a bottle and to be withdrawn therefrom while, when within the mouth, to provide a seal therewith. The tube 13 may also be conventional and may be a thistle tube, funnel tube or any other type of tube such as any of those well known in a laboratory. Generally, the tube 13 will be formed of glass and will be relatively fragile.

The stopper 10 must provide a fluid-tight seal about the tube 13 to prevent the escape of both liquids and gases. Therefore, the stopper must grip the tube tightly. This has heretofore presented a problem for where the stopper grips the tube throughout the length thereof enclosed by the stopper, the frictional resistance presented by the stopper to movement of the tube through the passage thereof has required the exertion of sufficient force upon the tube to frequently fracture and shatter it. Also, following use of the stopper, tube and flask, it will be found that the tube is frozen within the stopper and removal therefrom cannot be effectuated. For accuracy, the tube must be firmly supported throughout the length thereof enclosed by the stopper and is preferably oriented in a true vertical plane. Therefore, proposals for minimizing the resistance to movement afforded by the resilient rubber stoppers have not been successful for the resulting structure did not firmly grip the tube and position the same in a vertical plane, provide a fluid-tight seal thereabout and at the same time afford ready and relatively free movement of the tube within the passage through the stopper.

The passage 14 which I provide extends vertically through the stopper 10 and the lower portion of the passage, which is designated generally with the numeral 16, is relatively uniform in cross section and provides a continuous wall that engages the tube 13 continuously about the peripheral surface thereof. The upper end portion of the passage 14, which is designated generally with the numeral 17, is fluted and is equipped with a plurality of spaced-apart channels or recesses 18 which diverge upwardly and outwardly so that the stopper at the upper end thereof and at the channels 18 is spaced from the tube 13. However, interposed between the spaced-apart channels 18 are the ribs 19 which extend axially along the passage 14 and define a passage portion having substantially the same diameter as that of the passage portion 16. That is to say, the ribs 19 extend upwardly from the passage portion 16 of uniform cross section and define therebetween a continuation of the passage portion 16 and at the same diameter thereof. However, the channels or recesses 18 fan outwardly from the tube 13 and provide stopper portions that are not in contact with the tube 13.

In use of the stopper, the tube 13 is first inserted into the passage 14 and this may be accomplished in any well-known manner, and movement of the tube into the passage may be facilitated by lubricating the tube, such as by applying moisture thereto. The ribs 19 engage the tube 13 and in cooperation with the lower passage portion 16 firmly anchor the tube in position and orient it in a true vertical plane. At the same time the passage portion 16 engages the peripheral surface of the tube 13 contiguous therewith and forms a fluid-tight seal about the tube. The stopper is then inserted into the mouth of a flask or bottle, etc. as is seen best in Figure 2.

At the completion of an experiment, or when it is desired for any other reason to remove the tube from the stopper, the stopper is first withdrawn from the mouth of the flask and the tube 13 then withdrawn from the passage. Relatively free movement of the tube is provided for only a reduced area thereof is gripped by the stopper.

The precise dimensions of the channels 18 and ribs 19 may be varied as desired, and will depend somewhat upon the size of the stopper and the size of the passage or passages therethrough. In a specific example, a conventional No. 6 rubber stopper was equipped with a passage 14 therethrough in the form shown in the drawings. Six tapered channels or recesses 18 were provided and these channels diverged outwardly from the center of the passage at a point approximately 3/16 of an inch from the bottom of the stopper. The channels diverged uniformly from that point to a distance of substantially 1/16 of an inch from the tube 13 adjacent the upper surface of the stopper. Similarly, the width of the channels circumferentially about the tube 13, and therefore the spacing between the ribs 19, was 1/16 of an inch. Thus the channels and ribs extend for substantially more than half the length of the stopper and preferably more than three-fourths the length of the stopper to reduce frictional contact.

It will be understood that this example is illustrative only, and that the dimensions set out may be varied considerably and will be selected with relation to the particular stopper employed.

While in the foregoing specification an embodiment of the invention has been set out in considerable detail for purposes of illustration, it will be apparent to those skilled in the art that numerous changes may be made without departing from the spirit and principles of the invention.

I claim:

A rubber stopper adapted for use as a closure for flasks and the like, comprising a stopper having tapered side walls and being provided with at least one passage extending axially therethrough, said passage being adapted to removably receive a tube therein and having a lower end portion of uniform cross section adapted to sealingly engage a tube, said passage being fluted above the lower end portion of uniform cross section and providing a plurality of spaced-apart, axially extending ribs defining a passage section corresponding dimensionally to the lower end portion of uniform cross section and having channels interposed between said ribs, said channels having inclined side walls that diverge upwardly and outwardly from the longitudinal axis of said passage and are open to said passage throughout their length.

References Cited in the file of this patent
UNITED STATES PATENTS

| | | |
|---|---|---|
| 2,085,841 | Weiss | July 6, 1937 |
| 2,100,487 | Marsden | Nov. 30, 1937 |
| 2,153,981 | Heineman | Apr. 11, 1939 |
| 2,537,232 | Nottingham | Jan. 9, 1951 |
| 2,545,233 | Kaufman | Mar. 23, 1951 |
| 2,579,724 | Breakstone | Dec. 25, 1951 |